(12) United States Patent
Kawaguchi

(10) Patent No.: US 7,774,564 B2
(45) Date of Patent: Aug. 10, 2010

(54) MULTI-PROCESSOR SYSTEM, AND METHOD OF DISTRIBUTING MEMORY ACCESS LOAD IN MULTI-PROCESSOR SYSTEM

(75) Inventor: Eiichiro Kawaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 655 days.

(21) Appl. No.: 11/723,141

(22) Filed: Mar. 16, 2007

(65) Prior Publication Data

US 2007/0220195 A1    Sep. 20, 2007

(30) Foreign Application Priority Data

Mar. 20, 2006    (JP)    ............................. 2006-076982

(51) Int. Cl.
*G06F 12/00*    (2006.01)
(52) U.S. Cl. ............................. 711/159; 711/E12.039; 711/E12.066
(58) Field of Classification Search ....................... None
See application file for complete search history.

(56) References Cited

U.S. PATENT DOCUMENTS 4,035,779 A * 7/1977 Birney et al. ................. 711/164
5,860,116 A * 1/1999 Washington ................ 711/148

FOREIGN PATENT DOCUMENTS

JP    2005-216053    8/2005

* cited by examiner

*Primary Examiner*—Reginald G Bragdon
*Assistant Examiner*—Thanh D Vo
(74) *Attorney, Agent, or Firm*—McGinn IP Law Group, PLLC

(57) ABSTRACT

Disclosed is a multiprocessor system using a plurality of multi-chip packages mounted with at least one processor and at least one memory, wherein: the number of memory access to the memory by the processor is recorded, and if the number of memory access across different multi-chip packages exceeds the number of memory access within the same multi-chip package, the memory contents are swapped. A memory access load distributing method in a multiprocessor system is also disclosed.

2 Claims, 17 Drawing Sheets

TRACE COLLECTING TABLE FOR CPU (02) 12 — 4051

| ADDRESS HIGHER-ORDER BITS (BINARY DIGIT) | IMPLEMENTING PLACE | COUNTER |
|---|---|---|
| 00000000 (MMU(00)) | MCP(0) | 130 |
| 00000001 (MMU(01)) | MCP(0) | 2700 |
| 00000010 (MMU(02)) | MCP(0) | 800 |
| 00000011 (MMU(03)) | MCP(0) | 2500 |
| 00000100 (MMU(10)) | MCP(1) | 2300 |
| 00000101 (MMU(11)) | MCP(1) | 900 |
| 00000110 (MMU(12)) | MCP(1) | 250 |
| 00000111 (MMU(13)) | MCP(1) | 10 |
| ... | ... | ... |
| 11111111 (MMU(xx)) | MCP(x) | xxxx |

FIG.3A

TRACE COLLECTING TABLE FOR CPU (10) 20 — 4052

| ADDRESS HIGHER-ORDER BITS (BINARY DIGIT) | IMPLEMENTING PLACE | COUNTER |
|---|---|---|
| 00000000 (MMU(00)) | MCP(0) | 100 |
| 00000001 (MMU(01)) | MCP(0) | 900 |
| 00000010 (MMU(02)) | MCP(0) | 2200 |
| 00000011 (MMU(03)) | MCP(0) | 300 |
| 00000100 (MMU(10)) | MCP(1) | 500 |
| 00000101 (MMU(11)) | MCP(1) | 2900 |
| 00000110 (MMU(12)) | MCP(1) | 1400 |
| 00000111 (MMU(13)) | MCP(1) | 500 |
| ... | ... | ... |
| 11111111 (MMU(xx)) | MCP(x) | xxxx |

FIG.3B

EXAMPLE OF ADDRESS CONVERTING TABLE BEFORE MEMORY SWAP

| MEMORY ABSOLUTE ADDRESS HIGHER-ORDER BITS (BINARY DIGIT) | MEMORY REAL PHYSICAL ADDRESS HIGHER-ORDER BITS (BINARY DIGIT) |
|---|---|
| 00000000 | 00000000 |
| 00000001 | 00000001 |
| 00000010 | 00000010 |
| 00000011 | 00000011 |
| 00000100 | 00000100 |
| 00000101 | 00000101 |
| 00000110 | 00000110 |
| 00000111 | 00000111 |
| ... | ... |
| 11111111 | xxxxxxxx |

FIG.5

EXAMPLE OF ADDRESS CONVERTING TABLE AFTER MEMORY SWAP

| MEMORY ABSOLUTE ADDRESS HIGHER-ORDER BITS (BINARY DIGIT) | MEMORY REAL PHYSICAL ADDRESS HIGHER-ORDER BITS (BINARY DIGIT) |
|---|---|
| 00000000 | 00000000 |
| 00000001 | 00000001 |
| 00000010 | 00000100 |
| 00000011 | 00000011 |
| 00000100 | 00000010 |
| 00000101 | 00000101 |
| 00000110 | 00000110 |
| 00000111 | 00000111 |
| ... | ... |
| 11111111 | xxxxxxxx |

FIG.6

TRACE COLLECTING TABLE FOR CPU (02) 12 — 4051

| STATUS | ADDRESS HIGHER-ORDER BITS (BINARY DIGIT) | IMPLEMENTING PLACE | COUNTER |
|---|---|---|---|
| ..... | ..... | ..... | ..... |
| | 00000000 | MCP(0) | 130 |
| | 00000001 | MCP(0) | 2700 |
| | 00000010 | MCP(0) | 800 |
| | 00000011 | MCP(0) | 2500 |
| | 00000100 | MCP(1) | 2300 |
| COMPLETION | 00000101 | MCP(1) | 900 |
| | 00000110 | MCP(1) | 250 |
| | 00000111 | MCP(1) | 10 |
| ..... | ... | ... | ... |
| | 11111111 | MCP(x) | xxxx |

FIG.7A    FIG.7C

TRACE COLLECTING TABLE FOR CPU (10) 20 — 4052

| ADDRESS HIGHER-ORDER BITS (BINARY DIGIT) | IMPLEMENTING PLACE | COUNTER |
|---|---|---|
| 00000000 | MCP(0) | 100 |
| 00000001 | MCP(0) | 900 |
| 00000010 | MCP(0) | 2200 |
| 00000011 | MCP(0) | 300 |
| 00000100 | MCP(1) | 500 |
| 00000101 | MCP(1) | 2900 |
| 00000110 | MCP(1) | 1400 |
| 00000111 | MCP(1) | 500 |
| ... | ... | ... |
| 11111111 | MCP(x) | xxxx |

| STATUS | ADDRESS HIGHER-ORDER BITS (BINARY DIGIT) | IMPLEMENTING PLACE | COUNTER |
|---|---|---|---|
| ..... | ..... | ..... | ..... |
| | 00000000 | MCP(0) | 130 |
| COMPLETION | 00000001 | MCP(0) | 2700 |
| | 00000010 | MCP(0) | 800 |
| | 00000011 | MCP(0) | 2500 |
| | 00000100 | MCP(1) | 2300 |
| COMPLETION | 00000101 | MCP(1) | 900 |
| | 00000110 | MCP(1) | 250 |
| | 00000111 | MCP(1) | 10 |
| ..... | ... | ... | ... |
| | 11111111 | MCP(x) | xxxx |

| ADDRESS HIGHER-ORDER BITS (BINARY DIGIT) | IMPLEMENTING PLACE | COUNTER |
|---|---|---|
| 00000000 | MCP(0) | 100 |
| 00000001 | MCP(0) | 900 |
| 00000010 | MCP(0) | 2200 |
| 00000011 | MCP(0) | 300 |
| 00000100 | MCP(1) | 500 |
| 00000101 | MCP(1) | 2900 |
| 00000110 | MCP(1) | 1400 |
| 00000111 | MCP(1) | 500 |
| ... | ... | ... |
| 11111111 | MCP(x) | xxxx |

| ADDRESS HIGHER-ORDER BITS (BINARY DIGIT) | IMPLEMENTING PLACE | COUNTER |
|---|---|---|
| 00000000 | MCP(0) | 100 |
| 00000001 | MCP(0) | 900 |
| 00000010 | MCP(0) | 2200 |
| 00000011 | MCP(0) | 300 |
| 00000100 | MCP(1) | 500 |
| 00000101 | MCP(1) | 2900 |
| 00000110 | MCP(1) | 1400 |
| 00000111 | MCP(1) | 500 |
| ... | ... | ... |
| 11111111 | MCP(x) | xxxx |

FIG.9A (4051)

| ADDRESS HIGHER-ORDER BITS (BINARY DIGIT) | IMPLEMENTING PLACE | COUNTER |
|---|---|---|
| 00000000 | MCP(0) | 130 |
| 00000001 | MCP(0) | 2700 |
| 00000010 | MCP(0) | 800 |
| 00000011 | MCP(0) | 2500 |
| 00000100 | MCP(1) | 2300 |
| 00000101 | MCP(1) | 900 |
| 00000110 | MCP(1) | 250 |
| 00000111 | MCP(1) | 10 |
| ... | ... | ... |
| 11111111 | MCP(x) | xxxx |

FIG.9C

| STATUS |
|---|
| .... |
| COMPLETION |
| .... |
| COMPLETION |
| .... |
| COMPLETION |
| .... |
| .... |
| .... |
| .... |

FIG. 10A (4051)

| STATUS | ADDRESS HIGHER-ORDER BITS (BINARY DIGIT) | IMPLEMENTING PLACE | COUNTER |
|---|---|---|---|
| | 00000000 | MCP(0) | 130 |
| COMPLETION | 00000001 | MCP(0) | 2700 |
| | 00000010 | MCP(0) | 800 |
| COMPLETION | 00000011 | MCP(0) | 2500 |
| | 00000100 | MCP(1) | 2300 |
| COMPLETION | 00000101 | MCP(1) | 900 |
| | 00000110 | MCP(1) | 250 |
| | 00000111 | MCP(1) | 10 |
| | ... | ... | ... |
| | 11111111 | MCP(x) | xxxx |

FIG. 10B (4052)

| ADDRESS HIGHER-ORDER BITS (BINARY DIGIT) | IMPLEMENTING PLACE | COUNTER |
|---|---|---|
| 00000000 | MCP(0) | 100 |
| 00000001 | MCP(0) | 900 |
| 00000010 | MCP(0) | 2200 |
| 00000011 | MCP(0) | 300 |
| 00000100 | MCP(1) | 500 |
| 00000101 | MCP(1) | 2900 |
| 00000110 | MCP(1) | 1400 |
| 00000111 | MCP(1) | 500 |
| ... | ... | ... |
| 11111111 | MCP(x) | xxxx |

| ADDRESS HIGHER-ORDER BITS (BINARY DIGIT) | IMPLEMENTING PLACE | COUNTER |
|---|---|---|
| 00000000 | MCP(0) | 2300 |
| 00000001 | MCP(0) | 2700 |
| 00000010 | MCP(0) | 800 |
| 00000011 | MCP(0) | 2500 |
| 00000100 | MCP(1) | 130 |
| 00000101 | MCP(1) | 900 |
| 00000110 | MCP(1) | 250 |
| 00000111 | MCP(1) | 10 |
| ... | ... | ... |
| 11111111 | MCP(x) | xxxx |

FIG.11B (4052)

| ADDRESS HIGHER-ORDER BITS (BINARY DIGIT) | IMPLEMENTING PLACE | COUNTER |
|---|---|---|
| 00000000 | MCP(0) | 500 |
| 00000001 | MCP(0) | 900 |
| 00000010 | MCP(0) | 2200 |
| 00000011 | MCP(0) | 300 |
| 00000100 | MCP(0) | 100 |
| 00000101 | MCP(1) | 2900 |
| 00000110 | MCP(1) | 1400 |
| 00000111 | MCP(1) | 500 |
| ... | ... | ... |
| 11111111 | MCP(x) | xxxx |

FIG.11C

| STATUS |
|---|
| COMPLETION |
| COMPLETION |
|  |
| COMPLETION |
|  |
| COMPLETION |
|  |
|  |
| ... |
|  |

FIG. 12A

| STATUS | ADDRESS HIGHER-ORDER BITS (BINARY DIGIT) | IMPLEMENTING PLACE | COUNTER | ... |
|---|---|---|---|---|
| COMPLETION | 00000000 | MCP(0) | 2300 | ... |
| COMPLETION | 00000001 | MCP(0) | 2700 | ... |
|  | 00000010 | MCP(0) | 800 | ... |
| COMPLETION | 00000011 | MCP(0) | 2500 | ... |
|  | 00000100 | MCP(1) | 130 | ... |
| COMPLETION | 00000101 | MCP(1) | 900 | ... |
|  | 00000110 | MCP(1) | 250 | ... |
|  | 00000111 | MCP(1) | 10 | ... |
|  | ... | ... | ... | ... |
|  | 11111111 | MCP(x) | xxxx | ... |

| ADDRESS HIGHER-ORDER BITS (BINARY DIGIT) | IMPLEMENTING PLACE | COUNTER |
|---|---|---|
| 00000000 | MCP(0) | 500 |
| 00000001 | MCP(0) | 900 |
| 00000010 | MCP(0) | 2200 |
| 00000011 | MCP(0) | 300 |
| 00000100 | MCP(1) | 100 |
| 00000101 | MCP(1) | 2900 |
| 00000110 | MCP(1) | 1400 |
| 00000111 | MCP(1) | 500 |
| ... | ... | ... |
| 11111111 | MCP(x) | xxxx |

| STATUS |
|---|
| ... |
| COMPLETION |
| COMPLETION |
| ... |
| COMPLETION |
| COMPLETION |
| COMPLETION |
| |
| |
| ... |
| |

FIG. 13A (4051)

| ADDRESS HIGHER-ORDER BITS (BINARY DIGIT) | IMPLEMENTING PLACE | COUNTER |
|---|---|---|
| 00000000 | MCP(0) | 2300 |
| 00000001 | MCP(0) | 2700 |
| 00000010 | MCP(0) | 130 |
| 00000011 | MCP(0) | 2500 |
| 00000100 | MCP(1) | 800 |
| 00000101 | MCP(1) | 900 |
| 00000110 | MCP(1) | 250 |
| 00000111 | MCP(1) | 10 |
| ... | ... | ... |
| 11111111 | MCP(x) | xxxx |

FIG. 13B (4052)

| ADDRESS HIGHER-ORDER BITS (BINARY DIGIT) | IMPLEMENTING PLACE | COUNTER |
|---|---|---|
| 00000000 | MCP(0) | 500 |
| 00000001 | MCP(0) | 900 |
| 00000010 | MCP(0) | 100 |
| 00000011 | MCP(0) | 300 |
| 00000100 | MCP(1) | 2200 |
| 00000101 | MCP(1) | 2900 |
| 00000110 | MCP(1) | 1400 |
| 00000111 | MCP(1) | 500 |
| ... | ... | ... |
| 11111111 | MCP(x) | xxxx |

FIG.14A

| STATUS | ADDRESS HIGHER-ORDER BITS (BINARY DIGIT) | IMPLEMENTING PLACE | COUNTER |
|---|---|---|---|
| COMPLETION | 00000000 | MCP(0) | 2300 |
| COMPLETION | 00000001 | MCP(0) | 2700 |
| | 00000010 | MCP(0) | 130 |
| COMPLETION | 00000011 | MCP(0) | 2500 |
| COMPLETION | 00000100 | MCP(1) | 800 |
| COMPLETION | 00000101 | MCP(1) | 900 |
| COMPLETION | 00000110 | MCP(1) | 250 |
| | 00000111 | MCP(1) | 10 |
| ... | ... | ... | ... |
| | 11111111 | MCP(x) | xxxx |

| ADDRESS HIGHER-ORDER BITS (BINARY DIGIT) | IMPLEMENTING PLACE | COUNTER |
|---|---|---|
| 00000000 | MCP(0) | 500 |
| 00000001 | MCP(0) | 900 |
| 00000010 | MCP(0) | 100 |
| 00000011 | MCP(0) | 300 |
| 00000100 | MCP(1) | 2200 |
| 00000101 | MCP(1) | 2900 |
| 00000110 | MCP(1) | 1400 |
| 00000111 | MCP(1) | 500 |
| ... | ... | ... |
| 11111111 | MCP(x) | xxxx |

| ADDRESS HIGHER-ORDER BITS (BINARY DIGIT) | IMPLEMENTING PLACE | COUNTER |
|---|---|---|
| 00000000 | MCP(0) | 2300 |
| 00000001 | MCP(0) | 2700 |
| 00000010 | MCP(0) | 130 |
| 00000011 | MCP(0) | 2500 |
| 00000100 | MCP(1) | 800 |
| 00000101 | MCP(1) | 900 |
| 00000110 | MCP(1) | 250 |
| 00000111 | MCP(1) | 10 |
| ... | ... | ... |
| 11111111 | MCP(x) | xxxx |

FIG. 15B (4052)

| ADDRESS HIGHER-ORDER BITS (BINARY DIGIT) | IMPLEMENTING PLACE | COUNTER |
|---|---|---|
| 00000000 | MCP(0) | 500 |
| 00000001 | MCP(0) | 900 |
| 00000010 | MCP(0) | 100 |
| 00000011 | MCP(0) | 300 |
| 00000100 | MCP(1) | 2200 |
| 00000101 | MCP(1) | 2900 |
| 00000110 | MCP(1) | 1400 |
| 00000111 | MCP(1) | 500 |
| ... | ... | ... |
| 11111111 | MCP(x) | xxxx |

FIG. 15C

| STATUS |
|---|
| COMPLETION |
| COMPLETION |
| |
| COMPLETION |
| COMPLETION |
| COMPLETION |
| COMPLETION |
| |
| ... |
| |

FIG.16A (4051)

| ADDRESS HIGHER-ORDER BITS (BINARY DIGIT) | IMPLEMENTING PLACE | COUNTER |
|---|---|---|
| 00000000 | MCP(0) | 2300 |
| 00000001 | MCP(0) | 2700 |
| 00000010 | MCP(0) | 130 |
| 00000011 | MCP(0) | 2500 |
| 00000100 | MCP(1) | 800 |
| 00000101 | MCP(1) | 900 |
| 00000110 | MCP(1) | 250 |
| 00000111 | MCP(1) | 10 |
| ... | ... | ... |
| 11111111 | MCP(x) | xxxx |

FIG.16B (4052)

| ADDRESS HIGHER-ORDER BITS (BINARY DIGIT) | IMPLEMENTING PLACE | COUNTER |
|---|---|---|
| 00000000 | MCP(0) | 500 |
| 00000001 | MCP(0) | 900 |
| 00000010 | MCP(0) | 100 |
| 00000011 | MCP(0) | 300 |
| 00000100 | MCP(1) | 2200 |
| 00000101 | MCP(1) | 2900 |
| 00000110 | MCP(1) | 1400 |
| 00000111 | MCP(1) | 500 |
| ... | ... | ... |
| 11111111 | MCP(x) | xxxx |

FIG.16C

| STATUS |
|---|
| COMPLETION |
| COMPLETION |
| COMPLETION |
| COMPLETION |
| COMPLETION |
| COMPLETION |
| COMPLETION |
| ... |

MULTI-PROCESSOR SYSTEM, AND METHOD OF DISTRIBUTING MEMORY ACCESS LOAD IN MULTI-PROCESSOR SYSTEM

BACKGROUND OF THE INVENTION

1. Field of the Invention

The present invention relates to a multi-processor system. Specifically, the present invention relates to a multi-processor system that monitors the state of a load in memory access and distributes a load in memory access based on the monitoring so as to improve throughput of the entire multi-processor system, and a memory access load distributing method therefor.

2. Description of the Related Art

Many computer systems with high performance have adapted a multi-processor system mounted with a plurality of processors (CPUs) for improving total throughput. Many multi-processor systems adapts a system using a plurality of multi-chip packages (MCP) mounted with processors memories for eliminating the amount of hardware in a bus controlling unit and a bus signal line. In the multi-chip package, difference in memory access latency occurs due to the structure of the multi-chip package.

For example, in the multi-processor system of the NUMA (Non-Uniform Memory Access, Non-Uniform Memory Architecture), access latency from a CPU to an address space and access latency from the CPU to another address space are different. That is to say, in such a multi-processor system, an address space with a short latency and an address space with a long latency for the same CPU exist.

Generally, in the NUMA architecture, these two latencies differ in their performance by from threefold to fivefold. Japanese Patent Laid-Open Publication No. JP2005-216053A discloses a technique for converting a reallocated address of a memory in consideration of the usage of a memory in the system with at least two memories. Generally, the operating system (OS), however, does not control with consideration of physical relationship between a CPU and a memory, thus, it is hard to perform CPU allocation and memory allocation in consideration of memory access latency. Therefore, some resource allocation may cause memory access from a processor converges concentrate to an address space with a long latency, resulting in lower performance of the entire multi-processor system.

SUMMARY OF THE INVENTION

The present invention is adapted in view of the abovementioned problem. An object of the present invention is to provide a multi-processor system and a memory access load distributing method of the multi-processor system that optimizes memory access by optimizing CPU allocation and memory allocation in consideration with memory access latency so that performance does not lower.

The present invention provides a multiprocessor system using a plurality of multi-chip packages mounted with at least one processor and at least one memory, wherein: the number of memory access to the memory by the processor is recorded, and if the number of memory access across different multi-chip packages exceeds the number of memory access within the same multi-chip package, the memory contents are swapped.

Further, the present invention provides a memory access load distributing method in a multiprocessor system using a plurality of multi-chip packages mounted with at least one processor and at least one memory, wherein: the number of memory access to the memory by the processor is recorded, and if the number of memory access across different multi-chip packages exceeds the number of memory access within the same multi-chip package, the memory contents are swapped.

According to the present invention, throughput of the multi-processor system can be improved as memory access is optimized in consideration of memory access latency.

BRIEF DESCRIPTION OF THE DRAWINGS

Exemplary features and advantages of the present invention will become apparent from the following detailed description when taken with the accompanying drawings in which:

FIG. 3A and FIG. 3B are diagrams showing examples of a trace collecting table of memory access in an address tracing unit of FIG. 1;

FIG. 5 is a diagram showing an example of an address converting table before update in the first exemplary embodiment of the present invention;

FIG. 6 is a diagram showing an example of an address converting table after update in the first exemplary embodiment of the present invention;

FIG. 7A, FIG. 7B and FIG. 7C are tables showing an example of state for the trace collecting table is transferred by a first processing in FIG. 4;

FIG. 8A, FIG. 8B and FIG. 8C are tables showing an example of state for the trace collecting table is transferred by a second processing in FIG. 4;

FIG. 9A, FIG. 9B and FIG. 9C are tables showing an example of state for the trace collecting table is transferred by a third processing in FIG. 4;

FIG. 10A, FIG. 10B and FIG. 10C are tables showing an example of state for the trace collecting table before swapping by a fourth processing in FIG. 4;

FIG. 11A, FIG. 11B and FIG. 11C are tables showing an example of state for the trace collecting table after swapping by a fourth processing in FIG. 4;

FIG. 12A, FIG. 12B and FIG. 12C are tables showing an example of state for the trace collecting table before swapping by a fifth processing in FIG. 4;

FIG. 13A, FIG. 13B and FIG. 13C are tables showing an example of state for the trace collecting table after swapping by a fifth processing in FIG. 4;

FIG. 14A, FIG. 14B and FIG. 14C are tables showing an example of state for the trace collecting table is transferred by a sixth processing in FIG. 4;

FIG. 15A, FIG. 15B and FIG. 15C are tables showing an example of state for the trace collecting table is transferred by a seventh processing in FIG. 4;

FIG. 16A, FIG. 16B and FIG. 16C are tables showing an example of state for the trace collecting table is transferred by an eighth processing in FIG. 4;

DETAILED DESCRIPTION OF THE EXEMPLARY EMBODIMENTS

Exemplary embodiments of the present invention will now be described in detail in accordance with the accompanying drawings.

Figure 1:
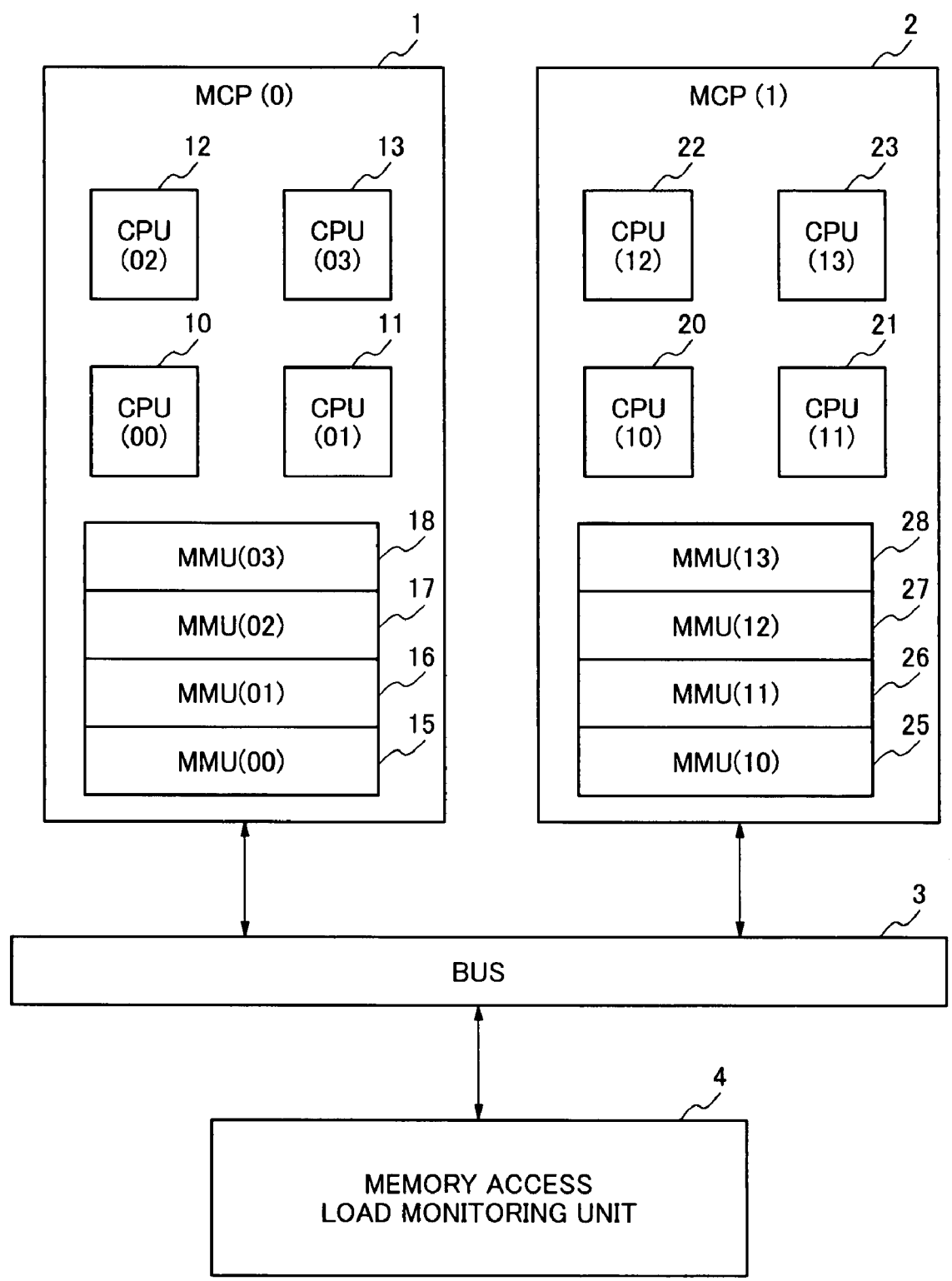
FIG. 1 is a block diagram showing a configuration of a multi-processor system in a first exemplary embodiment of the present invention.

FIG. 1 is a block diagram showing a configuration of a multi-processor system in the first exemplary embodiment of the present invention. In FIG. 1, the multi-processor system in the first exemplary embodiment of the present invention includes a plurality of multi-chip packages (MCP) 1 and 2, a bus 3, and a memory access load monitoring unit 4.

The MCP (0) 1 and MCP (1) 2 adapts a multi-chip package method for eliminating the amount of hardware and a bus signal line in a bus controlling unit. In the example shown in FIG. 1, processors (CPUs) 10, 11, 12, 13 and main memory units (MMUs) 15, 16, 17, 18 are mounted to a first MCP (0) 1. Similarly, processors (CPUs) 21, 22, 23, 24 and main memory units (MMUs) 25, 26, 27, 28 are mounted to a second MCP (1) 2.

The bus 3 connects the MCP (0) 1, the MCP (1) 2 and the memory access load monitoring unit 4. Although two MCPs are shown in FIG. 1, which is merely an example of a configuration, it may be configured by three or more MCPs. The memory access load monitoring unit 4 monitors a state of load on the memory by connecting to the MCP (0) 1 and the MCP (1) 2 via the bus 3 and swaps the contents of the memory so that the memory access is optimized.

Figure 2:
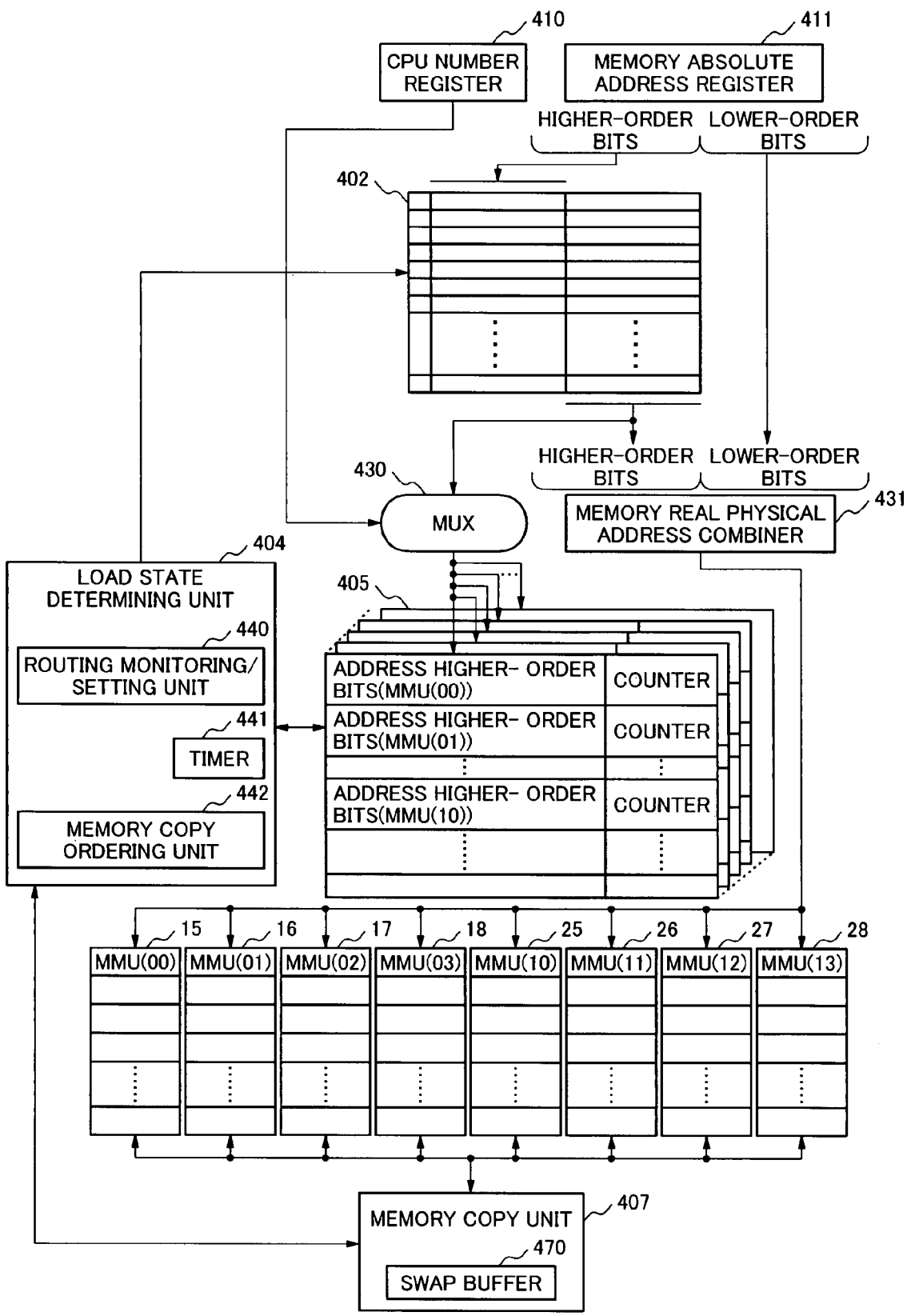
FIG. 2 is a block diagram showing a configuration of memory access load monitoring unit of FIG. 1.

FIG. 2 is a block diagram showing a configuration of memory access load monitoring unit 4 of FIG. 1. In FIG. 2, each MMU is also shown for convenience of the description. The memory access load monitoring unit 4 includes a CPU number register 410, a memory absolute address register 411, an address converting table 402, a multiplexer (MUX) 430, a memory real physical address combiner 431, an address tracing unit 405, a load state determining unit 404, and a memory copy unit 407.

The CPU number register 410 stores a CPU number, which is an identifier for determining which CPU accesses the memory. Generally, as an identifier for determining each processor (CPU) is included in a signal for accessing a memory in the multi-processor system, the identifier may be used. The stored CPU number is supplied to the MUX 410. The memory absolute address register 411 stores an address (memory absolute address) issued from a CPU when the CPU accesses the memory. The higher-order bits of the memory absolute address are supplied to the address converting table 402 and the lower-order bits are supplied to the memory real physical address combiner 431.

The address converting table 402 is a table for converting the memory absolute address recognized by the CPU into the memory real physical address. The memory real physical address is a physical address of the real memory on a platform. In the exemplary embodiment, the memory access load monitoring unit 4 converts the memory absolute address issued by the CPU into a memory real physical address to swap the contents of the memory so that the memory access is optimized. The address conversion enables the CPU to access the same MMU by using the same memory absolute address as that before the memory swap even after the memory swap. The higher-order bits of the memory absolute address are input into the address converting table 402 to convert the memory address. The memory address converting table 402 converts the higher-order bits of the input memory absolute address into the higher-order bits of the memory real physical address and supplies it into the memory real physical address combiner 431. The higher-order bits of the converted memory real physical address is also supplied to the MUX 430.

The memory real physical address combiner 431 combines a memory real physical address indicating a place of a physical memory cell on the platform. The higher-order bits of the memory real physical address is input from the address converting table 402. The lower-order bits of the memory absolute address in the memory absolute address register 411 is input as they are for the lower-order bits of the memory real physical address.

The address tracing unit 405 has a function of collecting trace data on a memory access frequency issued from the CPU and a trace collecting table prepared for each CPU. Each trace collecting table has an entry of the higher-order bits for each memory address space that can be swapped. Each entry has a counter that is incremented one by one each time when the address is accessed. Further, each entry has information (not shown) indicating a real position in the address space. It will be detailed later.

The MUX 430 is a multiplexer for selecting a trace collecting table of the address tracing unit 405. That is to say, a trace collecting table of the corresponding CPU is selected based on the CPU number input from the CPU number register 410 into the MUX 430. Further, a counter of the accessed memory address space is incremented based on the higher-order bits of the memory real physical address input from the address converting table 402 into the MUX 430.

The load state determining unit 404 has a function of determining whether or not to perform memory swap and routing change by referring to the address tracing unit 405 for every certain time. The load state determining unit 404 includes a routing monitoring/setting unit 440, a timer 441, and a memory copy ordering unit 442. The timer 441 activates the routing monitoring/setting unit 440 for every certain time. The routing monitoring/setting unit 440 has a pass for referring to the address tracing unit 405 and determines the superiority of the access latencies. If the latency determination at the routing monitoring/setting unit 440 determines that the memory swap is needed, the memory copy ordering unit 442 issues a memory swap executing order to the memory copy unit 407.

The memory copy unit 407 has a function of swapping the contents of a certain MMU and another MMU. The memory copy unit 407 includes a SWAP Buffer 470 that makes a temporally memory to execute a swapping operation of the memory contents.

Each MMU shown in FIG. 1 is a unit for swapping the memory contents whose configuration can be dynamically changed. The number of the higher-order bits to be stored in the address converting table 402 and the address tracing unit 405 and the size of the SWAP Buffer 470 are decided based on the memory capacity whose configuration can be changed.

For example, in the multiprocessor system with 256 MMUs each of which has a memory capacity of 16 MB ($=2^{24}$), the higher-order bits treated in the address converting table 402 is at least 8 bits. Similarly, the number of higher-order bits treated in the address tracing unit 405 is also 8 bits. Here, the SWAP Buffer 470 also needs at least 16 MB of region. As means for implementing the memory copy unit 407 does not directly relate to the present invention, it is omitted from the description.

Now, an operation of collecting an address trace in the exemplary embodiment will be described with reference to FIG. 2. If a load or store order is issued from the CPU shown in FIG. 1 to a MMU, the memory address the CPU is about to access is sent to the memory access load monitoring unit 4 with the CPU number of the issuing CPU and stored in the CPU number register 410 and the memory absolute address register 411.

The higher-order bits stored in the memory absolute address register 411 are converted into the higher-order bits of the memory real physical address by referring to the address converting table 402. That memory real physical address is a memory address for the real platform, and the MMU is accessed by using that memory real physical address for a load or store order issued from the CPU.

The higher-order bits of the memory real physical address are sent to the address tracing unit 405 via the MUX 430 with the CPU number. The address tracing unit 405 collects trace data on the memory access for each CPU number from the trace collecting table provided for each CPU.

FIG. 3A and FIG. 3B show an example of trace data on memory accesses issued from a CPU by a trace collecting table. Referring to the figures, collecting of trace data will be described.

First, if a system has 256 MMUs each of which has the least unit to be swapped of 16 MB ($2^{24}$), the higher-order bits of the memory real physical address to be traced are 8 bits. Thus, the trace data is collected by a unit of the higher-order 8 bits. The number of accesses is stored in the counter that counts the number of accesses to the memory real physical address space. Further, the trace collecting table includes implementing place information that indicates the MCP on which the memory real physical address space is present.

Although an exemplary trace collecting table of the CPU (02) 12 is described in FIG. 3A and an exemplary trace collecting table of the CPU (10) 20 is described in FIG. 3B for simplicity of the description, there are the actual trace collecting tables by the number of all the CPUs.

Now, determination whether or not to perform memory swap for improving latency performed by the load state determining unit 404 will be described.

The trace data stored in each trace collecting table of the address tracing unit 405 is periodically referenced by the load state determining unit 404. The routing monitoring/setting unit 440 in the load state determining unit 404 actually decides whether memory copy needs to be executed and whether address routing needs to be changed based on the trace data. The routing monitoring/setting unit 440 is activated for every certain time by the timer 441.

When the timer 441 detects that a certain time has elapsed, the routing monitoring/setting unit 440 is activated, and refers to the trace data of the address tracing unit 405. A case where the trace data when the routing monitoring/setting unit 440 is activated is in a state shown in FIG. 3A and FIG. 3B will be described below.

FIG. 3A shows an example of the trace collecting table 4051 that collects trace data of memory access issued from the CPU (02) 12. The CPU (02) 12 is implemented in the MCP (0) 1 as shown in FIG. 1.

Similarly, FIG. 3B shows an example of the trace collecting table 4052 that collects trace data of memory access issued from the CPU (10) 20. The CPU (10) 20 is implemented in the MCP (1) 2 as shown in FIG. 1.

In FIG. 3A and FIG. 3B, the trace data of the address higher-order bits 00000010 (binary digit) is noted. The memory real physical address space corresponds to 32 MB to 48 MB (0x02000000 to 0x02FFFFFF). That memory space is the MMU (02) 17 and present in the MCP (0) 1. As to the access to the MMU (02) 17 on the MCP (0) 1, the CPU (02) 12 on the same MCP (0) 1 accesses it 800 times (FIG. 3A) and the CPU (10) 20 on another MCP (1) 2 accesses it 2200 times (FIG. 3B). That is to say, as much more accesses are made to another MCP, it is understood that throughput is lowered in the entire system.

Specifically, it is shown that the processor CPU (02) 12 on the MCP (0) 1 accesses the main memory unit MMU (02) 17 on the same MCP with low frequency, and the processor CPU (10) 20 on the MCP (1) 2 accesses the MMU (02) 17 on the MCP (0) 1 with high frequency. A pattern in which a memory with a long latency is selected is frequently used, which lowers the total throughput due to a configuration of the hardware in that state.

Similarly, the trace data of the address higher-order bits 00000100 (binary bits) is noted. The memory real physical address space corresponds to 64 MB to 80 MB (0x04000000 to 0x04FFFFFF). That memory space is the MMU (10) 25 and present in the MCP (1) 2. As to the access to the MMU (10) 25 on the MCP (1) 2, the CPU (10) 20 on the same MCP (1) 2 accesses it 500 times (FIG. 3B) and the CPU (02) 12 on another MCP (0) 1 access it 2300 times (FIG. 3A). This is neither in a good condition for the throughput.

Then, the routing monitoring/setting unit 440 determines that the latency is improved if the memory contents of the address higher-order bits 00000010 and the memory contents of the higher-order bits 00000100 of the memory real physical address are swapped, for example, based on the trace data. That is to say, it is decided that the memory swap of the MMU (02) 17 and the MMU (10) 25 is needed, for example, for improving the latency.

Figure 4:
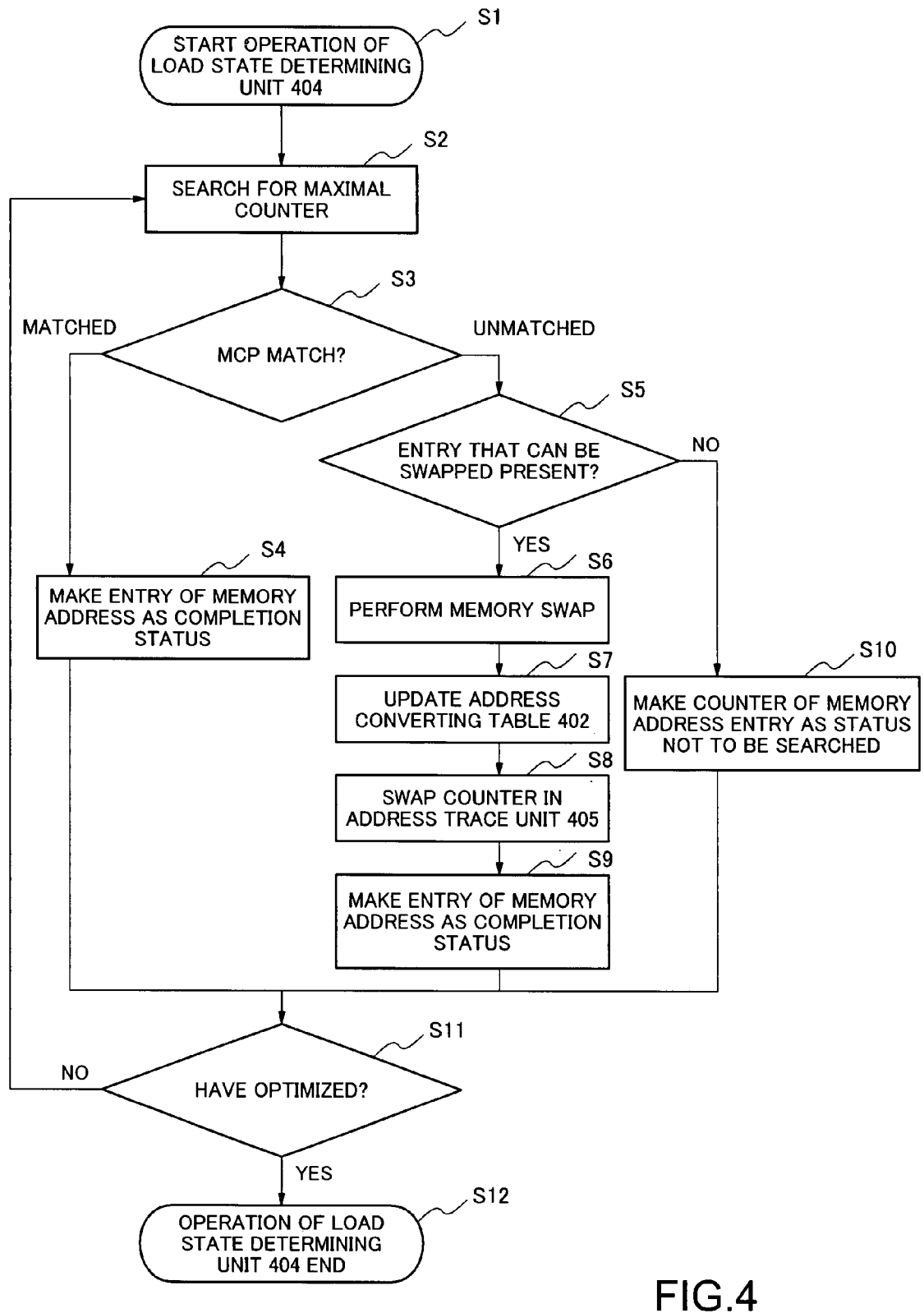
FIG. 4 is a flowchart showing an operation of the first exemplary embodiment of the present invention.

FIG. 4 is a flowchart showing an operation of performing the abovementioned decision in the exemplary embodiment. Referring to FIG. 4, an operation of swapping the memory contents in the exemplary embodiment will be described.

The load state determining unit 404 starts for every certain time (step S1), and searches a counter with the maximal value among the counters collected in the address tracing unit 405 (step S2). Here, the accessing CPU can be determined from the CPU number on the trace collecting table with the maximum counter. Accordingly, the MCP on which that CPU is implemented is determined (i.e., CPU implemented MCP). The MCP on which a memory (MMU) shown in the memory address of the counter with the maximal value that is searched at the step S2 is also determined (i.e., MMU implemented MCP) from the trace collecting table. It is checked whether the MMU implemented MCP and the CPU implemented MCP match or not (step S3).

If they match at the step S3, it is known that the memory is present on the MCP to which the accessing CPU belongs. Therefore, the access is appropriate, and the operation proceeds to the step S4. At the step S4, as the memory access latency of the address range is optimum, the address entry is changed to the completion status so that the memory address entry is not to be swapped in the processes thereafter. That is to say, the completion status indicates that the address space has been optimized.

If they do not match at the step S3, it is known that the memory is not present on the MCP to which the accessing CPU belongs. That is to say, it is determined that the memory is to improve the memory access latency (swapping candidate) and the operation proceeds to the step S5.

At the step S5, it is checked whether the entry for enabling memory swap is present or not. That is to say, the routing monitoring/setting unit 440 refers to the trace collecting table of the accessing CPU (the same trace collecting table as that of the entry of the maximal counter) for checking whether the memory address entry with the least memory access frequency (least counter) is present in the memory address entries on the MCP in the same CPU and not in the completion status. At the step 5, if the memory address entry that satisfies the abovementioned condition is present, it is determined that the memory address entry to be swapped (a counterpart of the swapping) is present, and the operation proceeds to the step S6. Here, the presence of the memory address entry to be swapped means that the number of the memory access across MCPs is over the number of memory access in the same MCP.

At the step S6, in response to the order from the memory copy ordering unit 442, the memory copy unit 407 executes memory swap for two entries to be swapped. Accordingly, the routing monitoring/setting unit 440 updates the address converting table 402 (step S7). Then, the routing monitoring/setting unit 440 exchanges counter values of the address tracing units 405 between the memory swapped address entries (step S8). This is because that the entry to be swapped detected at the step S5 (an entry with low access frequency and to be swapped) can be further optimized, thus, the state of the counter needs to be appropriate.

After the memory swap is executed at the steps S6 to S8, the address range (the address range with the maximal counter detected at the step S2) has been optimized, therefore the status is changed to the completion status (step S9). That is to say, it is in the same state as the completion state of the step S4. The entry to be swapped (i.e., the counterpart of the swapping) detected at the step S5 does not transfer to the completion status. This is because the entry to be swapped can be further optimized.

If no memory address entry that satisfies the condition is present at the step S5, it is determined that no memory address entry that can be swapped is present, and the operation proceeds to the step S10 for post processing. At the step S10, as the entry (an entry with the maximal counter detected at the step S2) cannot improve the latency, the status of the counter is changed to the status not to be searched so as not to be searched at the step S2 again. Here, the status not to be searched for the counter is applied only to the counter. The completion status of the memory address entry is added to the address over all the trace collecting tables at the steps S4 and S9.

The routing monitoring/setting unit 440 determines whether the optimization is completed after the steps S4, S9 and S10 (step S11). If no optimization to be performed, i.e., all the memory address entries are in the completion status, or if no counter to be searched is present at the step S2, the operation transfers to the step S12 and the processing ends. When the optimization ends, the counters for all the trace data are cleared, and trace data is collected again until the load state determining unit 404 is activated again after a certain time.

At the step S11, if optimization can be performed, the operation transfers to the step S2 again, and processing is repeated form searching for the counter of the maximal value. Here, the memory address entry with the completion status and the entry of the status not to be searched at the step S10 are excluded for searching at the step S2. The processing will be repeated in the similar manner hereafter.

The abovementioned memory swapping operation is started as the memory copy ordering unit 442 issues an instruction to the memory copy unit 407 to perform memory copy. The memory copy unit 407 first copies either piece of data to the SWAP Buffer 470 for swapping the memory contents of the higher-order bits 00000010 and the memory contents of the higher-order bits 00000100 as mentioned above.

It is assumed that the memory contents of the higher-order bits 00000010 are copied to the SWAP Buffer 470. Then, the memory contents of the higher-order bits 00000100 are copied to the space of the higher-order bits 00000010. Finally, the original memory contents of the higher-order bits 00000010 stored in the SWAP Buffer 470 are copied to the space of the higher-order bits 00000100 and the swapping of the contents of the both memory spaces completes.

As the memory real physical address needs to be changed where the operating system does not know after the memory swapping completed, the address converting table 402 is updated. FIG. 5 shows an example of the address converting table 402 before the memory swap is performed. In FIG. 5, the memory absolute address higher-order bits and the memory real physical address higher-order bits have the same value. If it is determined that the memory swap is valid based on the analysis of the trace data and the memory contents are swapped, the address converting table 402 is changed so that the operating system can properly access the original memory contents. FIG. 6 shows an example where the state of the address converting table 402 is changed from the state of that shown in FIG. 5.

That is to say, in FIG. 6, which shows the updated example, the memory absolute address higher-order bits 00000010 (binary digits) correspond to the memory real physical address higher-order bits 00000100 (binary digits), and the memory absolute address higher-order bits 00000100 (binary digits) correspond to the memory real physical address higher-order bits 00000010 (binary digits).

According to the updating in the address converting table 402, relationship between the memory absolute address and the memory real physical address is appropriately kept, so that the latency for the memory space actually to be accessed can be improved without the memory space recognized from the operating system being contradicted.

Now, operation of the present invention will be described with reference to a specific example. How the trace data is transferred is shown in FIG. 7A to FIG. 16C by using an example of the trace collecting table 4051 and 4052 shown in FIG. 3A and FIG. 3B. When the routing monitoring/setting unit 440 is activated in the state of FIG. 3A and FIG. 3B, at the step S2 of FIG. 4, the address higher-order bits 00000101 (i.e., MMU (11) 26) indicating the maximal counter 2900 in the trace collecting table 4052 of the CPU (10) 20 is selected. However, it is checked that the address entry (MMU (11) 26) and the CPU (10) 20 are on the same MCP (1) 2 at the step S3, the operation proceeds to the step S4. At the step S4, the address entry of the address higher-order bits 00000101 is made as a completion status, and the operation proceeds to the step S11, where the first routing ends. The state is shown in FIG. 7A to FIG. 7C.

As the optimization has not ended at the step S11, the operation returns to the step S2, where the second processing starts (FIG. 8A to FIG. 8C). At the step S2, the address higher-order bits 00000001 (i.e., MMU (01) 16) indicating the maximal counter of 2700 in the trace collecting table 4051 of the CPU (02) 12 are selected. At the step S3, as it is checked that the address entry (MMU (01) 16) and the CPU (02) 12 are on the same MCP (0) 1, they are considered as in the completion status as in the first time.

In the following third-processing, the address higher-order bits 00000011 indicating the maximal counter of 2500 in the trace collecting table 4051 is selected at the step S2. Here, it is also checked matching of the MCP at the step S3, the address entry is considered as in the completion status (FIG. 9A to FIG. 9C).

In the fourth processing, at the step S2, the address higher-order bits 00000100 indicating the maximal counter of 2300 in the trace collecting table 4051 is selected. As it is detected that the MCPs do not match at the step S3, the operation proceeds to the step S5. At the step S5, the address higher-order bits 00000000 on the MCP (0) 1 (least counter of 130) is selected to be swapped in the same trace collecting table 4051 (FIG. 10A to FIG. 10C). The memory is swapped at the step S6, and the trace data is swapped at the step S7 (FIG. 11A to FIG. 11C). That is to say, the counter value of the address higher-order bits 00000000 and the counter value of the address higher-order bits 00000100 are exchanged. At the step S9, only the address entry of the address higher-order bits 00000000 after swapping with the maximal counter 2300 is considered as in a completion status. The address higher-order bits 00000100 in the address entry with the least counter 130 at the swapped side (the counterpart of the swapping) are not considered as in a completion status.

In the following fifth processing, the counter value 2200 of the address higher-order bits 00000010 of the trace collecting table 4052 and the counter value 100 of the address higher-order bits 00000100 match the swapping conditions (FIG. 12A to FIG. 12C) and they are swapped (FIG. 13A to FIG. 13C). Here, the address higher-order bits 00000010 with the least counter 100 at the swapped side address entry are neither considered as in the completion status.

In the sixth processing, the address higher-order bits 00000110 indicating the maximal counter of 1400 in the trace collecting table 4052 is selected at the step S2. It is checked that the MCPs match at the step S3, however, and the address entry is considered as in the completion status (FIG. 14A to FIG. 14C).

In the seventh processing, the address higher-order bits 00000111 indicating the maximal counter of 500 in the trace collecting table 4052 is selected at the step S2. It is checked that the MCPs match at the step S3, however, and the address entry is considered as in the completion status (FIG. 15A to FIG. 15C).

In the eighth processing, the address higher-order bits 00000010 indicating the maximal counter of 130 in the trace collecting table 4051 is selected at the step S2. It is checked that the MCPs match at the step S3, however, and the address entry is considered as in the completion status (FIG. 16A to FIG. 16C).

As such, the processing is repeated until it is checked that the optimization has completed at the step S11, and all the counters are cleared when the processing ends.

As mentioned above, in the exemplary embodiment of the present invention, performance of the platform can be improved with the optimization in consideration of memory access latency.

Also in the exemplary embodiment of the present invention, the most optimum state for the memory access latency can always be kept by repeating such an optimization for every certain time.

Also in the exemplary embodiment of the present invention, the optimum configuration in consideration of the memory access latency can be obtained with the configuration of the architecture (implementation/physical relationship of processor and memory) being transparent by the operating system.

Figure 17:
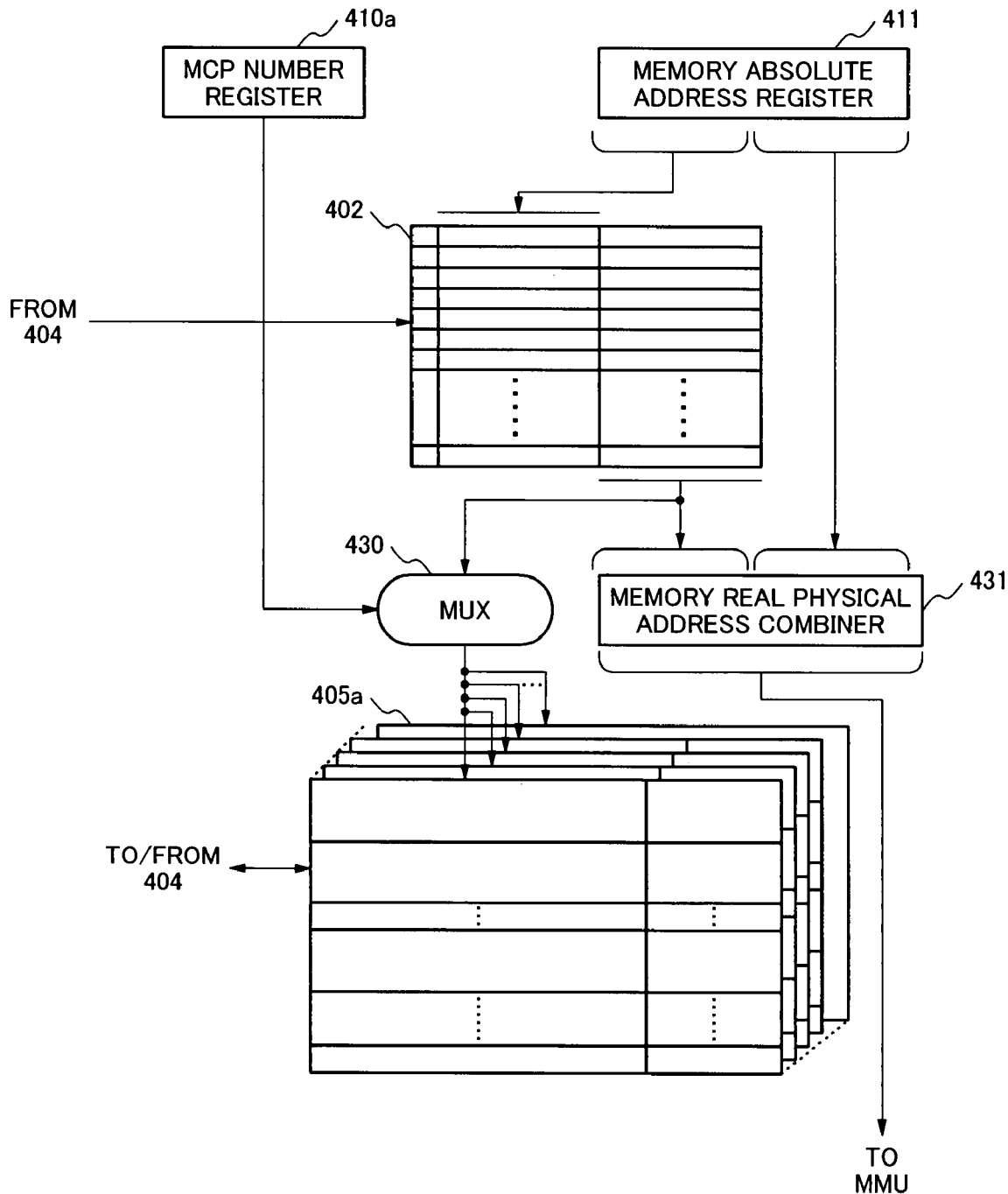
FIG. 17 is a block diagram showing a partial configuration in the second exemplary embodiment of the present invention.

Now, the second exemplary embodiment of the present invention will be described. In the second exemplary embodiment, the trace collecting table of the address tracing unit can be provided for each MCP instead for each CPU. In such a case, it has the same effect as that of the basic concept in the processing algorithm. In FIG. 17, only the part relating to the difference from that in FIG. 1 is described in the second exemplary embodiment of the present invention. Specifically, the CPU number register 410 and the address tracing unit 405 (FIG. 1) are changed to the MCP number register 410a and the address tracing unit 405a (FIG. 17), respectively. In the second exemplary embodiment of the present invention, the functional block that is not shown in FIG. 17 is the same as that of FIG. 1. Further, in the second exemplary embodiment of the present invention, the block denoted by the same reference numeral as FIG. 1 is the same as that of FIG. 1.

In the address tracing unit 405a, the trace collecting table is provided for each MCP number as mentioned above. When each CPU accesses a memory (MMU), it issues the MCP number indicating the MCP to which the CPU is implemented together with the memory address. The issued MCP number is kept in the MCP number register 410a and supplied to the MUX 430. In the MUX 430, the corresponding trace collecting table is selected by the input MCP number, and the counter of the entry indicated by the memory real physical address higher-order bits output from the address converting table 402 is incremented. In the case of the second exemplary embodiment, the value of the counter is the sum of the number of access from all the CPUs implemented on the same MCP instead of the sum of the number of access from each CPU.

For operation of the load state determining unit 404 of the second exemplary embodiment, the operation of the first exemplary embodiment described in FIG. 4 only needs to be the operation directly for the MCP number instead of the operation for each of the CPU numbers. For example, at the step S3 in FIG. 4, the MCP to which an objective MMU is implemented matches with the accessing MCP. Similarly at the step S5, an entry that can be memory swapped is searched for from the trace collecting table of the same MCP.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to retain all equivalents of the claimed invention even if the claims are amended during prosecution.

This application is based on Japanese Patent Application No. JP 2006-76982 filed on Mar. 20, 2006, and including a specification, claims, drawings and summary.

What is claimed is:

1. A multi-processor system using a plurality of multi-chip packages mounted with at least one processor and at least one memory, comprising:
   a memory absolute address register for storing a memory absolute address recognized by the processor;
   an address converting table for converting higher-order bits of the memory absolute address into higher-order bits of a memory real physical address on a platform;
   a trace collecting table provided for each of the processors, comprising an entry provided for each of memory address spaces that can be swapped in the memory real physical address and a counter for recording a number of a memory access from a corresponding processor to the memory address corresponding to each entry;
   a load state determining unit for referring to contents of the trace collecting table, deciding the memory address space to execute a memory swap, and executing a swap of the memory real physical address in the address converting table, and also making a status of the entry corresponding to the memory real physical address that performed the swap in the trace collecting table as completed;

a memory real physical address combiner for combining the higher-order bits of the memory real physical address stored in the address converting table with lower-order bits of the memory absolute address stored in the memory absolute address register and outputting a combined address as a memory real physical address;

a memory copy unit for executing the memory swap in response to an instruction of the load state determining unit; and a timer, wherein the load state determining unit searches for a maximal value among the counters of the trace collecting table and recognizes a corresponding processor and an implementing place of the memory indicated in the entry, and if they are not mounted to the same multi-chip package, makes the memory address space indicated by the entry as a candidate for swapping, and then refers to the trace collecting table, and searches for an entry with a minimal value of the counter among memory that is mounted to the same multi-chip package to which the corresponding processor is mounted and whose entry is not in a completion status, and decides the memory address space indicated by the entry as a counterpart of the swap, and wherein the load state determining unit is activated in a certain cycle of counts of the timer, performs a determination whether the memory swap is needed or not, and when the determination completes, clears the counter of the trace collecting table.

2. A multi-processor system using a plurality of multi-chip packages mounted with at least one processor and at least one memory, comprising:

a memory absolute address register for storing a memory absolute address recognized by a multi-chip package;

an address converting table for converting higher-order bits of the memory absolute address into higher-order bits of a memory real physical address on a platform;

a trace collecting table provided for each of the multi-chip packages, comprising an entry provided for each of the memory address spaces that can be swapped in the memory real physical address and a counter for recording a number of a memory access from a corresponding multi-chip package to the memory address corresponding to each entry;

a load state determining unit for referring to contents of the trace collecting table, deciding the memory address space to execute a memory swap, and executing a swap of the memory real physical address in the address converting table, and also making a status of the entry corresponding to the memory real physical address that performed the swap in the trace collecting table as completed;

a memory real physical address combiner for combining the higher-order bits of the memory real physical address stored in the address converting table with lower-order bits of the memory absolute address stored in the memory absolute address register and outputting the combined address as a memory real physical address;

a memory copy unit for executing memory swap in response to an instruction of the load state determining unit; and a timer, wherein the load state determining unit searches for a maximal value among the counters of the trace collecting table and recognizes a corresponding multi-chip package and an implementing place of the memory indicated in the entry, and if the memory is not mounted to the same corresponding multi-chip package, makes the memory address space indicated by the entry as a candidate for swapping, and then refers to the trace collecting table, and searches for an entry with a least value of the counter in memory that is mounted to the corresponding multi-chip package and whose entry is not in a completion status, and decides the memory address space indicated by the entry as a counterpart of the swap, and wherein the load state determining unit is activated in a certain cycle of counts of the timer, performs determination whether the memory swap is needed or not, and when the determination completes, clears the counter of the trace collecting table.

* * * * *